United States Patent Office 2,953,459
Patented Sept. 20, 1960

2,953,459

EFFERVESCIVE CONCENTRATE

Isaac M. Diller, Stamford, Conn., assignor to Henry Brout, Larchmont, N.Y.

No Drawing. Filed May 10, 1957, Ser. No. 658,217

7 Claims. (Cl. 99—78)

This invention relates to a carbonated soft drink and to a concentrate, i.e., an effervescive dry powder or tablet, for producing the same. More particularly, it relates to improvements in the concentrates disclosed in my copending patent applications Serial Nos. 517,373, now Patent 2,851,361, and 418,745, now Patent 2,851,359, filed June 22, 1955, and March 25, 1954, respectively.

Briefly, there is disclosed in the aforesaid copending applications a concentrate of the character described including an acid factor and a carbonate factor, the latter being characterized by the presence of a massive amount of calcium carbonate to yield protracted ebullience and said concentrate being so constituted that a carbonated drink prepared therefrom is unclouded despite the presence of such relatively insoluble salt.

Although the particular concentrates disclosed in said applications are eminently satisfactory, they are subject to certain drawbacks. For example, I have found that there is a slight delay in the clearing time of beverages prepared therefrom and that the time of clearing sometimes varies more than is desirable in a commercial product. Also, a precipitate forms on the wall of the beverage container about three-quarters of an hour after the concentrate has been introduced. Such precipitate is quite hard to remove, requiring for this purpose scouring or acid treatment. Although 45 minutes ordinarily is more than enough for the consumption of carbonated beverages, it is of course desirable that formation of the precipitate be prevented or at least held off for a longer time. Thus, if a precipitate does not form for several hours, the beverage is more certain to have been entirely consumed and the glass containing it washed out. Moreover, it is desirable for any precipitate which does form, if, for example, a glass is allowed to stand over night, to be easily removable.

In addition to the above, I have found that as the constituents of the aforesaid concentrates initially react, fine droplets tend to spray out of the glass obliquely and wet the area around the same. Although this does not detract from the properties of the resulting beverage, it does militate against consumer acceptability and, accordingly, creates a problem in merchandising the item.

It is an object of the present invention to provide concentrates of the character described in which the foregoing difficulties are overcome without loss of any desirable characteristics.

Other objects of the invention in part will be obvious and in part will be pointed out hereinafter.

The invention accordingly consists in the concentrates and carbonated drinks hereinafter described and of which the scope of application will be indicated in the appended claims.

I have found that by incorporation of minute and critical amounts of an additive comprising glycine and/or sodium hexametaphosphate the time before which a precipitate forms after preparation of a beverage with my concentrate is extended to not less than two hours and as long as four hours. Furthermore, the precipitate which does eventually form when either or both of these compounds are present washes out readily in running water. In addition, the clearing time of beverages made from concentrates including the aforesaid ingredients in proper amounts is reduced by approximately twenty-five percent.

I believe that the additive when used in proper quantities slows up precipitation by inhibiting nucleation and particle growth and improves the removability of the precipitate by altering its crystalline and adhesive qualities.

The amount of glycine to be used is 96 milligrams for each 3.0 grams of calcium carbonate in the concentrate. Sodium hexametaphosphate is used in amounts of 2.7 milligrams for each 3.0 grams of calcium carbonate.

The optimum proportions of additive vary slightly with differences in acidity of the beverage to be produced, caused, for example, by use of different flavors; moreover, different conditions of use of the concentrate, for example, the temperature of the water into which it is introduced, also influence the amount of additive to be used. In no case, however, should there be a variation of more than ten percent from the quantities set forth above because greater variation will impair the function of the additive.

The glycine and sodium hexametaphosphate may either be used alone or together. Preferably, these compositions are used together, better results being obtained this way.

The use of the additive described above in proper amounts results in a concentrate having greater consumer acceptability inasmuch as the delayed onset of precipitation minimizes the likelihood of a consumer ever seeing the precipitate. In almost all cases the glass containing the beverage would have been washed before the precipitate comes down. Moreover, formation of the precipitate is not nearly so undesirable as is the case with concentrates not produced in accordance with the present invention because it can be easily washed out. Still further, a fast clearing drink is more saleable than one which fails to clear as readily as desired and consistency of time in clearing makes for a more reliable and acceptable product.

In summary, as a result of the present improvements to my concentrates, it is possible for the concentrate to produce a beverage more closely approximating the attributes of conventional pressure packed carbonated beverages.

As to the spraying problem, I have found that it is possible to alter the nature of the fine droplets projected from a beverage produced by my concentrate so that the spray comes out substantially vertically instead of angularly. This avoids a wetting of the surrounding area outside the glass because the spray will fall back into the glass. The above can be accomplished by incorporating into the surface of the concentrate an anti-foaming organo polysiloxane such, for example, as a silicone of the anti-foam type, a commercial example of the latter being DC Anti-Foam A or dehydrated DC Anti-Foam AF, products of the Dow Corning Corporation of Midland, Michigan. For example, the anti-foam agent can be sprayed in a dispersion which also contains a lubricant on the tableting dies before pressing each tablet of the concentrate. The agent not only aids as a lubricant for tableting but some of it remains on the outside of the tablet and accomplishes the desired result alluded to above. In addition, the anti-foam agent operates to prevent foam from rising out of the glass when the concentrate is being used.

Organo-polysiloxanes which function satisfactorily in the practice of my invention are of the formula $$Si_nO_{n-1}R_{2n+2}$$

where $n$ is any integral number and R is any single alkyl or aryl group or combination thereof, that is, different R groups may be combined in a single organo-polysiloxane to add up to the total number of R groups required by the formula. The alkyl groups may be saturated or un-unsaturated and examples thereof are methyl, ethyl, propyl, butyl, amyl, hexyl, heptyl, octyl, decyl, dodecyl, vinyl and allyl. Examples of the aryl group are phenyl, toluyl and naphthyl.

It may be mentioned that in commercial silicones $n$ reaches very high values and the chain is so long that the values of $n$ are not used to denote the compounds, but rather physical properties are employed for this purpose. The physical property commonly employed is viscosity. Silicones of all viscosities have been found to be operable in the practice of the invention—even as high as 100,000 centistokes.

Silicone antifoam agents which function most satisfactorily in the practice of the invention are a mixture of alkyl silicones such as described above and an unsubstituted silica. DC Antifoam A, for example is a physical mixture of methyl polysiloxane (specific gravity 0.95 plus or minus 0.05) and finely divided silica. A silicone antifoam agent such as described is characterized by its ability, when added to a liquid, to prevent or suppress foam, or alter the nature thereof. However, in accordance with my invention the antifoam agent is used as a solid incorporated in the surface of the tablet.

In one typical use of an anti-foam agent according to my invention, the Dow Corning Anti-Foam A is mixed with polyethylene glycol (average molecular weight 4,000) in a ratio of approximately 1.6 parts of anti-foam agent to 1.0 part of glycol. The mixture is suspended in a highly volatile solvent such, for example, as trichlorethylene, carbon tetrachloride, Freon 12 or a mixture thereof. A satisfactory ratio of mixture to solvent is one to fifty by volume.

The above described mixture is sprayed on the tableting dies in an atomized jet, as from a paint sprayer at ordinary spraying pressures. A typical tablet for a seven ounce drink will require an amount of anti-foam agent in the order of magnitude of one milligram.

The combination of pressure, concentration of solution or dispersion, and spraying time is so adjusted that the amount deposited on the die wall will be ample for lubrication, while sufficiently limited so that the foam will not be utterly extinguished for it is necessary to have a certain amount of foaming and the principal object is to change the character of the foam so that it sprays vertically instead of in all directions rather than to extinguish it.

As a result of the last mentioned improvements, my concentrates are made more acceptable commercially since messy and inconvenient spraying of the surrounding area during use are avoided.

By way of example, there are set forth below three concentrates embodying the instant invention; the amounts given being specified in grams and being proper for a 7 oz. drink.

|  | Orange | Black Cherry | Kola |
|---|---|---|---|
| Citric acid (anhydrous) | 4.663 | 5.121 | 4.683 |
| CaCO$_3$ | 2.687 | 2.687 | 2.687 |
| KHCO$_3$ | 1.282 | 1.229 | 1.152 |
| CaH$_4$(PO$_4$)$_2$ (anhydrous) | | .084 | .078 |
| Glycine | .082 | .091 | .080 |
| Sodium hexametaphosphate | .0024 | .0026 | .0024 |
| Flavor (including gum) | .110 | .040 | .042 |
| Dye (certified colors) | .014 | .013 | .024 |
| Sugar | 25.0 | 25.0 | 24.0 |
| Caffeine | | | .054 |
| KH$_2$PO$_4$ | | | .080 |

The above flavors are flavor oils which have been sealed in a solid gum carrier in accordance with conventional practice.

The following is an example for coating the walls of a tableting die pursuant to the present invention: 1.6 grams of DC Anti-foam A or dehydrated DC Anti-foam AF, 1 gram of polyethylene glycol (average molecular weight 4,000) and trichlorethylene are made up to 100 grams and sprayed or brushed on the die walls so that 100 milligrams is deposited thereon per tablet. The solvent is evaporated before the tableting operation is performed, leaving about 2 milligrams of solids on the die walls per tablet.

It thus will be seen that I have provided compounds which achieve the several objects of my invention and are well adapted to meet the conditions of practical use.

As various possible embodiments might be made of the above invention and as various changes might be made in the embodiments above set forth, it is to be understood that all matter herein described is to be interpreted as illustrative and not in a limiting sense.

Having thus described my invention, I claim as new and desire to secure by Letters Patent:

1. In combination with a dry effervescive beverage concentrate of the type including an acid factor and a massive quantity of calcium carbonate in the carbonate factor, a reagent for speeding up the time to clear the carbonated beverage formed when said concentrate is added to water, to delay the inception of precipitation and to render the material precipitated less clinging to a receptacle in which the beverage is contained, said reagent including a tiny amount of an additive selected from the class consisting of unreacted glycine in the order of 96 milligrams for each 3.0 grams of calcium carbonate and unreacted sodium hexametaphosphate in the order of 2.7 milligrams for each 3.0 grams of calcium carbonate.

2. In combination with a dry effervescive beverage concentrate of the type including an acid factor and a massive quantity of calcium carbonate in the carbonate factor, a reagent for speeding up the time to clear the carbonated beverage formed when said concentrate is added to water, to delay the inception of precipitation and to render the material precipitated less clinging to a receptacle in which the beverage is contained, said reagent including a tiny amount of an additive constituting unreacted sodium hexametaphosphate in the order of 2.7 milligrams for each 3.0 grams of calcium carbonate.

3. In combination with a dry effervescive beverage concentrate of the type including an acid factor and a massive quantity of calcium carbonate in the carbonate factor, a reagent for speeding up the time to clear the carbonated beverage formed when said concentrate is added to water, to delay the inception of precipitation and to render the material precipitated less clinging to a receptacle in which the beverage is contained, said reagent including a tiny amount of an additive constituting unreacted glycine in the order of 96 milligrams for each 3.0 grams of calcium carbonate and unreacted sodium hexametaphosphate in the order of 2.7 milligrams for each 3.0 grams of calcium carbonate.

4. In combination with a dry effervescive beverage concentrate of the type including an acid factor and a massive quantity of calcium carbonate in the carbonate factor, a reagent for speeding up the time to clear the carbonated beverage formed when said concentrate is added to water, to delay the inception of precipitation and to render the material precipitated less clinging to a receptacle in which the beverage is contained, said reagent including an additive constituting about 96 milligrams, ±10% of unreacted glycine for each 3.0 grams of calcium carbonate.

5. In combination with a dry effervescive beverage concentrate of the type including an acid factor and a massive quantity of calcium carbonate in the carbonate factor, a reagent for speeding up the time to clear the carbonated beverage formed when said concentrate is added to water, to delay the inception of precipitation and to render the material precipitated less clinging to a receptacle in which the beverage is contained, said reagent including an additive constituting about 2.7 milligrams, ±10% of unreacted sodium hexametaphosphate for each 3.0 grams of calcium carbonate.

6. In combination with a dry effervescive beverage concentrate of the type including in the carbonate factor a quantity of calcium carbonate for protracted ebullience and also including a gum, an additive constituting an organo polysiloxane anti-foam agent incorporated in the surface of the dry concentrate, said additive being present in an amount in the order of 1 milligram per 3.5 grams of calcium carbonate.

7. In combination with a dry effervescive beverage concentrate of the type including a massive quantity of calcium carbonate in the carbonate factor, a tiny amount of an additive constituting unreacted glycine in the order of 96 milligrams for each 3.0 grams of calcium carbonate, unreacted sodium hexametaphosphate in the order of 2.7 milligrams for each 3.0 grams of calcium carbonate and an organo polysiloxane anti-foam agent.

References Cited in the file of this patent

UNITED STATES PATENTS

| | | |
|---|---|---|
| 2,366,857 | Hurka | Jan. 9, 1945 |
| 2,375,007 | Larsen et al. | May 1, 1945 |
| 2,463,962 | Gorcica et al. | Mar. 8, 1949 |
| 2,474,704 | Taylor | June 28, 1949 |
| 2,512,192 | Yen et al. | June 20, 1950 |
| 2,603,569 | Alther et al. | July 15, 1952 |
| 2,764,486 | Stevens et al. | Sept. 25, 1956 |
| 2,784,100 | Endicott et al. | Mar. 5, 1957 |